June 29, 1937.  A. F. HANSON  2,085,583
WELDING METHOD
Original Filed May 13, 1932
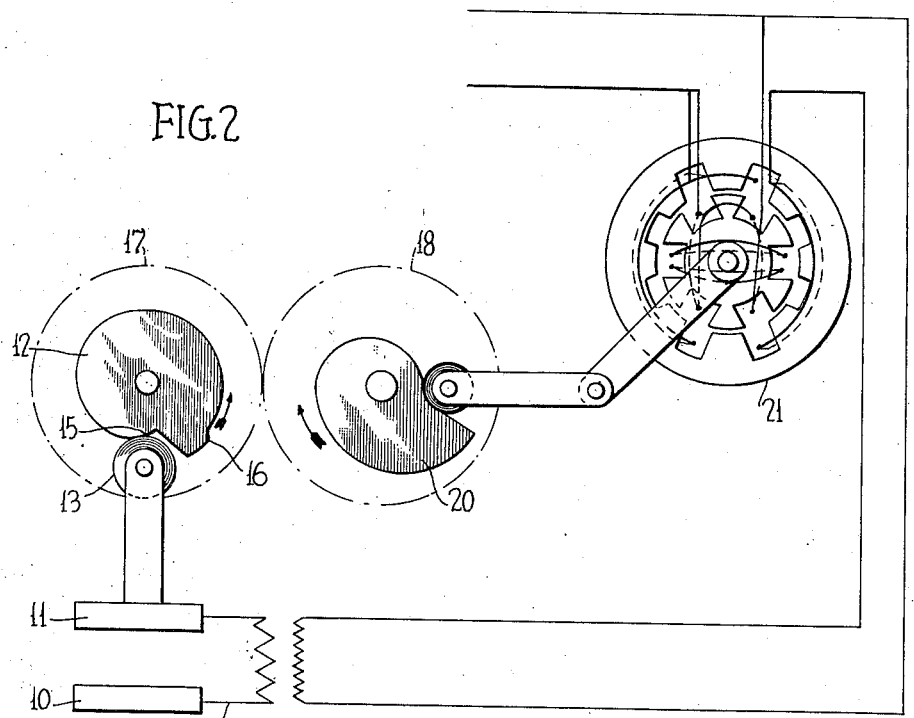
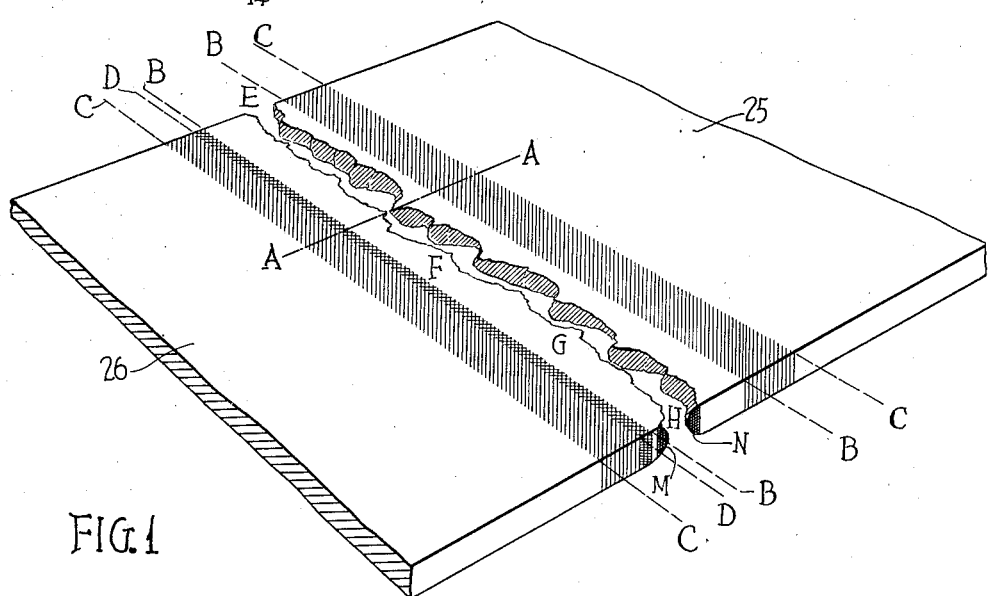
INVENTOR
ARTHUR F. HANSON.
BY John P. Tarbox
ATTORNEY Patented June 29, 1937

2,085,583

UNITED STATES PATENT OFFICE 2,085,583

WELDING METHOD

Arthur F. Hanson, Philadelphia, Pa., assignor to Budd Wheel Company, Philadelphia, Pa., a corporation of Pennsylvania Application May 13, 1932, Serial No. 611,003
Renewed November 23, 1934

4 Claims. (Cl. 219—10)

This invention relates to a method of flash welding metal sheets and has for its principal object the flash welding of metal sheets having critical characteristics, wherein the melting and welding temperatures are extremely close together. Another object of this invention is to obtain a method of welding whereby a ductile weld in contra-distinction to a brittle weld may be obtained in flash welded stainless steel sheets.

This invention is susceptible of use with regard to steel generally inasmuch as the same steps are followed, but with ordinary carbon steel the welding and melting temperatures are sufficiently far apart to allow fairly accurate control of the welding operation with very slight danger of seriously affecting the structure of the sheet metal itself in the line of the weld.

In flash welding the arc is initially started and is continued until sufficient metal has been burned off of the adjacent sheets so that a condition of parallelism exists between the edges and a sufficient depth of metal at weldable temperature exists, so that a uniform weld may be obtained across the entire welded edges. When a weld is obtained by using relatively high voltage, the molten metal at the edge of the sheet is thrown off rapidly by the arc and the band of metal at welding temperature adjacent the edge is of extremely slight depth. If any substantial irregularity between the two parts should occur, the sheets will contact at some point causing a path of low resistance to be formed, thus causing them to be welded together at one point and a stall will occur. This is possibly due to the slight depth of weldable metal being pushed from between the sheets, leaving the edges of the sheet not at welding temperature upset and no weld is formed. It will be impossible to restart the arc and the work is from a commercial standpoint practically valueless. To avoid such conditions it is essential that a relatively great depth of metal at weldable temperature exists co-extensive with the edges of the sheets to be welded, so that any slight irregularity will be compensated for, by the increased depth of weldable metal.

With relatively high voltages this band of weldable metal is very narrow, whereas at the relatively low voltage the band is substantially greater. The relative low voltage does not adapt itself to easy starting of the arc and also causes the time for accomplishing the first stage of the welding operation, namely; straightening of the edges to be longer in duration. Although as applied to ordinary steel, a variation of several hundred degrees exists between the welding and melting temperatures, in stainless steel and also in tool steels, this variation is extremely small, possibly in the nature of 40 or 50°, thereby making extremely difficult, any accurate control in stainless steel welding.

I have attained the desirable objects enumerated heretofore and others incidental thereto by means of the welding method disclosed, wherein I initiate an arc by the use of relatively high voltage and continue this voltage until the initial stage of welding has occurred and a condition of edge parallelism exists between the sheet metal parts. The voltage is then reduced to allow a sufficient depth of metal at weldable temperature to attain, after which time the voltage is suddenly cut off and the weld made.

In the accompanying drawing, I have illustrated schematically in the two figures the method herein disclosed.

Figure 1 shows schematically an automatic arrangement co-ordinated with the die operation.

Figure 2 shows two sheets in perspective, representing approximately the conditions occurring during the welding operations but exaggerated for the purpose of clearness.

The drawing herein is not made the basis of structural claims, but is merely for the purpose of showing the practicability of the method disclosed. The relatively approachable welding dies 10 and 11 of Figure 1 are operated by means of a cam 12 and follower mechanism 13 and are energized by means of a welding circuit 14. The cam operating the die approach has a suitable control surface to give a rapid approach of the die at 15 during the initial flash period and a uniform slow approach thereafter up until the push-up 16 which occurs after the voltage is cut off. The cam is indicated as related to a gear 17 of substantial radius, which is co-operative with another gear 18 controlling the cam 20. The cam 20 is adapted to control automatically the voltage applied to the welding dies by means of an induction regulator 21, suitable linkage means being interposed between the movable parts of the regulator and the cam to transmit the control motion therebetween. It is obvious that the contour of the cam 20 is not meant to represent relative values of the voltage, but is merely indicative of a surface adapted to the needs of the method herein disclosed. The automatic means for cutting off the power supply at the proper time with regard to the push-up, is not shown because such automatic mechanism may be readily adapted to the needs of the machine.

In Figure 2 the adjacent edges of two sheet metal members 25 and 26 are shown having a relatively rough edge E—F—G—H. In the drawing the rough edges are greatly exaggerated although, a condition approximating that illustrated on a very much smaller scale exists in actual practice even though the sheets have been trimmed. The line A—A showing the sheets at the least air gap would be the point where the initial flashing began. The approach movement and flashing at high voltage would continue until the edges had been flashed off to a condition substantially approaching line B—B of either sheet. Thereafter the voltage would be reduced in accordance with the characteristics of the material so that a relatively great depth of weldable metal would exist between the lines B—B and C—C of the adjacent sheets, as the edge would have been burned off to the lines B—B and the flashing would now extend entirely along the adjoining edges. The proper depth of weldable metal is obtained at the relatively low voltage then the power is suddenly cut off and just as rapidly the sheets are butted together and the weld between the parts formed.

When a weld is made at high voltage, the depth of weldable metal would be relatively shallow substantially as shown on the left hand sheet between the lines B—B and D—D. The weld formed between sheets in this condition would possibly give a large number of small welded areas which would be extremely brittle, whereas a continuous weld of substantial uniformity throughout the width of the sheets would not be attainable. The sheet areas M and N substantially represent the depth of molten metal during the flashing operation and the slightly darkened area the metal at weldable temperature.

I again reiterate the adaptability of the method herein disclosed to use regarding ordinary steel, wherein it is susceptible of marked advantage, but its special superiority is in connection with sheets having critical characteristics such as stainless steel. I aim to cover by the hereto appended claims all modifications within the truly generic spirit of my invention.

What I claim is:
1. The method of flash welding stainless steel which comprises initiating the flash by relatively high voltage, using a slow approach of the edges to be welded, progressively reducing the voltage synchronously with and in proportion to said approach, suddenly cutting off the voltage and flashing and as suddenly moving the edges together under high pressure to effect the weld.

2. The method of flash welding steel sheets whose melting temperature is not over 50 degrees higher than their weldable temperature which comprises initiating the flash by high voltage, using a slow continuous approach of the edges to be welded with proportional reduction of voltage until a condition of edge parallelism is obtained, the reduction of voltage being always such as to avoid raising the temperature of the margins of the metal over 50 degrees higher than the weldable temperature, then cutting off the voltage suddenly and as suddenly butting the edges together to form the weld.

3. The method of flash welding stainless steel which comprises initiating the flash with relatively high voltage, then using a slow approach of the edges to be welded together, and thru and by virtue of the approach movement progressively reducing the voltage to that adapted for a ductile weld.

4. The method of flash welding steel sheets which comprises initiating the flash by high voltage and using a rapid approach until a condition of edge parallelism obtains, then using a slow approach of the edges to be welded at progressively reduced voltage until a proper depth of metal at weldable temperature exists, then rapidly cutting off the voltage and as suddenly butting the edges together to form the weld.

ARTHUR F. HANSON.